Figure 1:
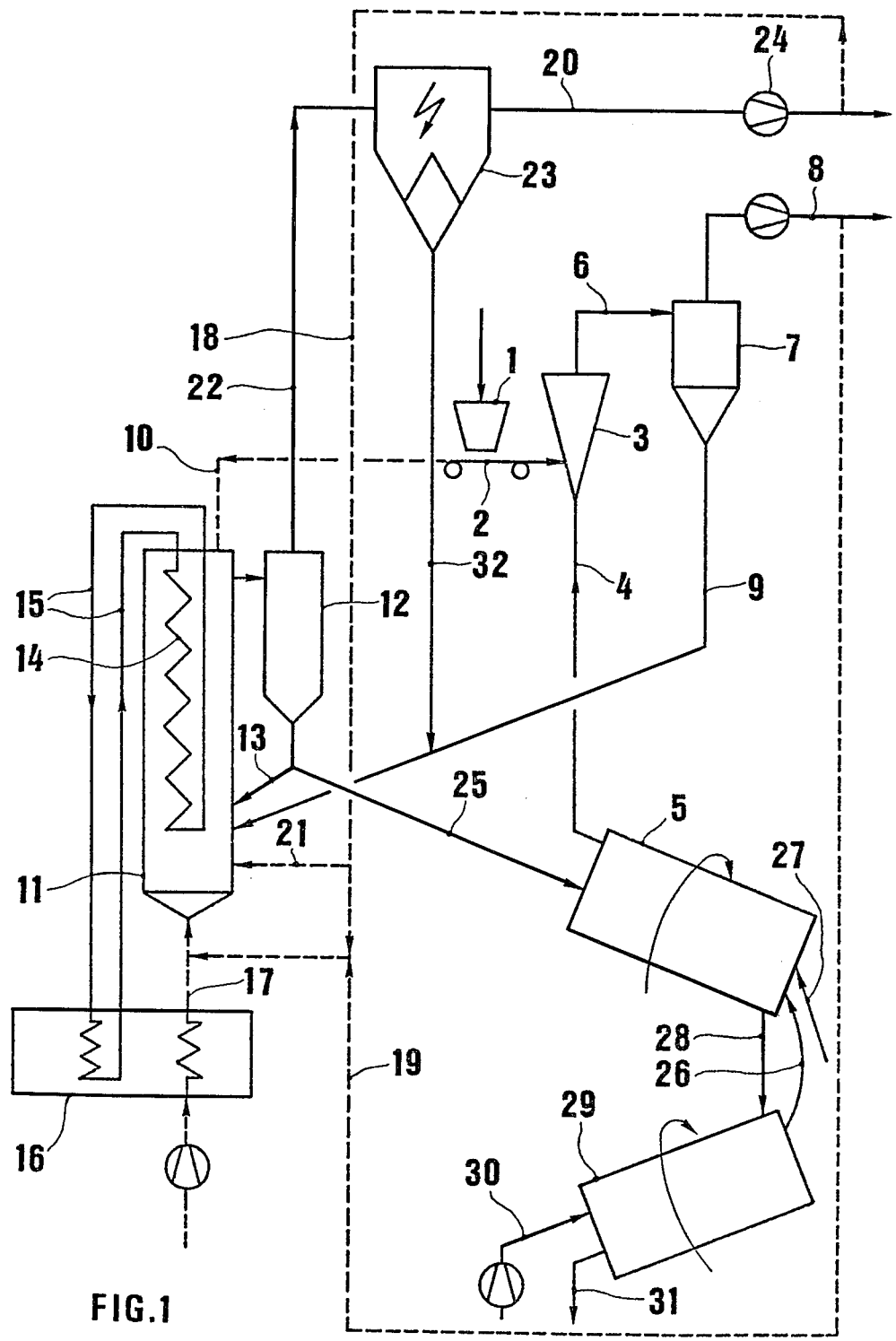

United States Patent [19]
Reh et al.

[11] 4,107,281
[45] Aug. 15, 1978

[54] PROCESS FOR THE THERMAL DECOMPOSITION OF ALUMINUM CHLORIDE HEXAHYDRATE TO OBTAIN ALUMINA

[75] Inventors: Lothar Reh, Bergen-Enkheim; Ludolf Plass, Kronberg, both of Fed. Rep. of Germany; Philippe Marchessaux, Chemin des Trois Moulins, France

[73] Assignee: Aluminum Pechiney, Lyon, France

[21] Appl. No.: 823,643

[22] Filed: Aug. 11, 1977

[30] Foreign Application Priority Data

Aug. 16, 1976 [DE] Fed. Rep. of Germany ....... 2636855

[51] Int. Cl.² .............................................. C01F 7/30
[52] U.S. Cl. .................................... 423/625; 23/262; 23/277 R; 23/284; 34/10; 34/11; 423/DIG. 16; 423/481; 432/15
[58] Field of Search ............... 423/625, DIG. 16, 481; 34/10; 432/15

[56] References Cited

U.S. PATENT DOCUMENTS

| | | | |
|---|---|---|---|
| 2,539,263 | 1/1951 | Munday | 423/DIG. 16 |
| 2,780,525 | 2/1957 | Wendell et al. | 423/625 |
| 3,130,008 | 4/1964 | Stokes et al. | 423/625 |
| 3,144,303 | 8/1964 | Engelmann | 423/DIG. 16 |
| 3,579,616 | 5/1971 | Reh et al. | 423/DIG. 16 |
| 3,648,380 | 3/1972 | Goulbrul | 423/DIG. 16 |
| 3,754,993 | 8/1973 | Oguchi et al. | 423/DIG. 16 |
| 3,836,635 | 9/1974 | Reh et al. | 423/DIG. 16 |

FOREIGN PATENT DOCUMENTS

| | | | |
|---|---|---|---|
| 788,920 | 7/1968 | Canada | 432/15 |
| 2,261,083 | 7/1974 | Fed. Rep. of Germany | 423/625 |
| 38-1,353 | 2/1961 | Japan | 423/625 |

OTHER PUBLICATIONS

Reh, "Fluidized Bed Processing", Pub. in Chemical Engineering Progress, vol. 67, 1971, pp. 58–63.

*Primary Examiner*—Herbert T. Carter
*Attorney, Agent, or Firm*—McDougall, Hersh & Scott

[57] ABSTRACT

The thermal decomposition of aluminum chloride hydrate in which the preponderant portion of the hydrate is thermally decomposed in an indirectly heated reaction chamber while in a fluidized state with any remainder thermally decomposed in a directly heated rotary furnace and passing the formed aluminum oxide in heat exchange with combustion gases to cool the aluminum oxide and to preheat the combustion gases.

9 Claims, 2 Drawing Figures

PROCESS FOR THE THERMAL DECOMPOSITION OF ALUMINUM CHLORIDE HEXAHYDRATE TO OBTAIN ALUMINA

This invention relates to a process for the thermal decomposition of aluminum chloride hydrate with decomposition of at least the preponderant part of the aluminum chloride hydrate in an indirectly heated decomposition reactor, calcination and decomposition of possible residual quantities of aluminum chloride in a directly heated rotary furnace and cooling of the aluminum oxide formed in a rotary cooler accompanied by the simultaneous preheating of oxygen-containing combustion gas.

It is already known to thermally decompose metal chlorides, either in the form of solution or in the form of salts and thus produce hydrogen chloride and the metal oxide corresponding to the metal chloride.

Decomposition takes place through direct heating in spray roasting furnaces (Stahl und Eisen, Vol. 84, 1964, page 18041ff) or in fluidized-bed reactors (DOS No. 1,546,164, DAS No. 1,667,180, DOS No. 2,261,083 and U.S. Pat. No. 3,440,009).

However, the decomposition of solutions and also of previously crystallized metal chlorides by direct heating leads to comparatively dilute hydrochloric acid solutions, which is in particular disadvantageous if highly concentrated solutions of pure hydrogen chloride are required.

The process described in Austrian Pat. No. 315,207 aims at producing highly concentrated hydrogen chloride, whereby indirect heating takes place in the decomposition stage by admixing solid and previously heated heat carriers, such as corundum or iron or the actual roasted material. Although the sought objective is attainable with this process, it still has an important disadvantage. If the heat carriers are constituted by materials which are foreign to the process, i.e. not the finished process products, costly equipment is necessary for separation and recycling. If the heat carrier is a process product, due to the high power requirement, a considerable product flow, generally a multiple of the charged quantity of material, must be recycled to the decomposition furnace. The costs for material conveying and for high temperature-resistant conveying equipment are not inconsiderable.

The problem of the invention is to provide a process which does not have the known disadvantages, whilst in particular retaining the advantage of producing a highly concentrated hydrogen chloride, whilst obviating the disadvantage of moving large material flows.

According to the invention, this problem is solved by a process of the type defined hereinbefore in which at least the preponderant part of the aluminum chloride hydrate is decomposed in the fluidized state, accompanied by the supply of decomposing energy via heating surfaces 14.

The fluidized state, in which at least the preponderant part of the hydrogen chloride is separated by indirect heating, can correspond to that of a conventional fluidized bed, preferably with an average suspension density of 600 to 1000 kg/m$^3$ and a turbulent gas velocity of below 0.8m/sec, or alternatively an expanded fluidized bed with recycling of solids (circulating fluidized bed), preferably with an average suspension density of 50 to 400 kg/m$^3$ and a turbulent gas velocity of 1.5 to 5m/sec.

An advantage of using a conventional fluidized bed is the high heat transfer coefficient, resulting from the high suspension density. A disadvantage is that due to the low intensity of turbulence, overheating phenomena can occur in the vicinity of the heating surfaces. When using an expanded fluidized bed with recycling of solids, overheating phenomena are reliably avoided, whilst the disadvantage of the lower heat transfer coefficients are largely compensated by the possibility of providing a high circulation rate.

The above-mentioned turbulence gas velocity relates to the effective velocity of the gas occurring with indirect decomposition. It essentially comprises a mixture of the fluidizing gas used, the vapor formed from moisture and water of crystallization introduced, and the hydrogen chloride gas formed by chemical reaction of the aluminum chloride and evaporation of physically adhering hydrogen chloride. The gas velocity relates to the fluidized-bed reactor free from fluidized material.

Optionally, preheated foreign gases can be used for operating the fluidized bed. However, it is advantageous to use waste gases from the rotary furnace for calcining the aluminum oxide. If decomposition of at least the preponderant part of the aluminum chloride takes place by using a conventional fluidized bed, it is recommended to use the gases as secondary gases fed in above the bed surface, whereby their temperature is reduced. This is performed in accordance with an advantageous development of the invention in that the waste gas from the rotary furnace in direct heat exchange is brought into contact with suitable quantities of fresh aluminum chloride hydrate. If separation of the hydrogen chloride is performed by using a circulating fluidized bed, there is no need to cool the gas which is supplied as fluidizing gas and/or secondary gas. If the temperature reduction is desired, this advantageously takes place in suspension exchanges, having a suspension zone, e.g. a Venturi turbulator and optionally a separating zone in the form of a cyclone separator. It is also possible to operate the fluidized-bed reactor by its own waste gases, preferably after removing dust in an electrostatic precipitator. An operation with only a single product gas flow is possible by appropriate recycling of the gases of the decomposition reactor or the rotary furnace.

Indirect heating of the fluidized-bed reactor advantageously takes place by heating surfaces suspended in the reactor, which are subject to the action of liquid heat carriers for heat exchange such as fused salt baths or oils. Tube plates connected by guide plates (thin tubes) are particularly advantageous. When using a conventional fluidized bed, it is recommended to fit the tube plates in such a way that there is a horizontal course of the tube, whereas when using a circulating fluidized bed, the tubes are directed vertically for reasons of reduced errosion. The supply of heat carriers, fluidizing gas, optionally secondary gas, as well as aluminum chloride hydrate and optionally their recirculation rates are to be matched to one another in such a way that, according to a preferred embodiment of the invention, the fluidized-bed temperature is between 200° and 400° C.

In the case of the preferred embodiment of the invention where the fluidized-bed temperature is 200° to 400° C, the waste gases have approximately the same temperature and can be fed directly to an electrostatic precipitator for the separation of entrained dust.

The residence time of the fluidized material is advantageously made sufficiently long to decompose approximately 70 to 95% of the chloride.

For decomposition of at least the preponderent part of the aluminum chloride, a stream of fluidized material is continuously removed from the reactor and fed into the rotary furnace. In the latter, the particles are heated and the remaining chloride is decomposed, accompanied by the giving off of hydrogen chloride. The rotary furnace is operated in, per se, known manner and is heated directly by using fuel oil and/or fuel gas. The temperature profile is thereby set in such a way that there is a temperature of 750° to 1100° C in the hot zone.

After a sufficiently long residence time, the now completely calcined aluminum oxide passes into a rotary cooler where it is cooled using oxygen-containing gases. Due to the cooling, end temperatures of the aluminum oxide of about 100° C are obtained.

Figure 2:
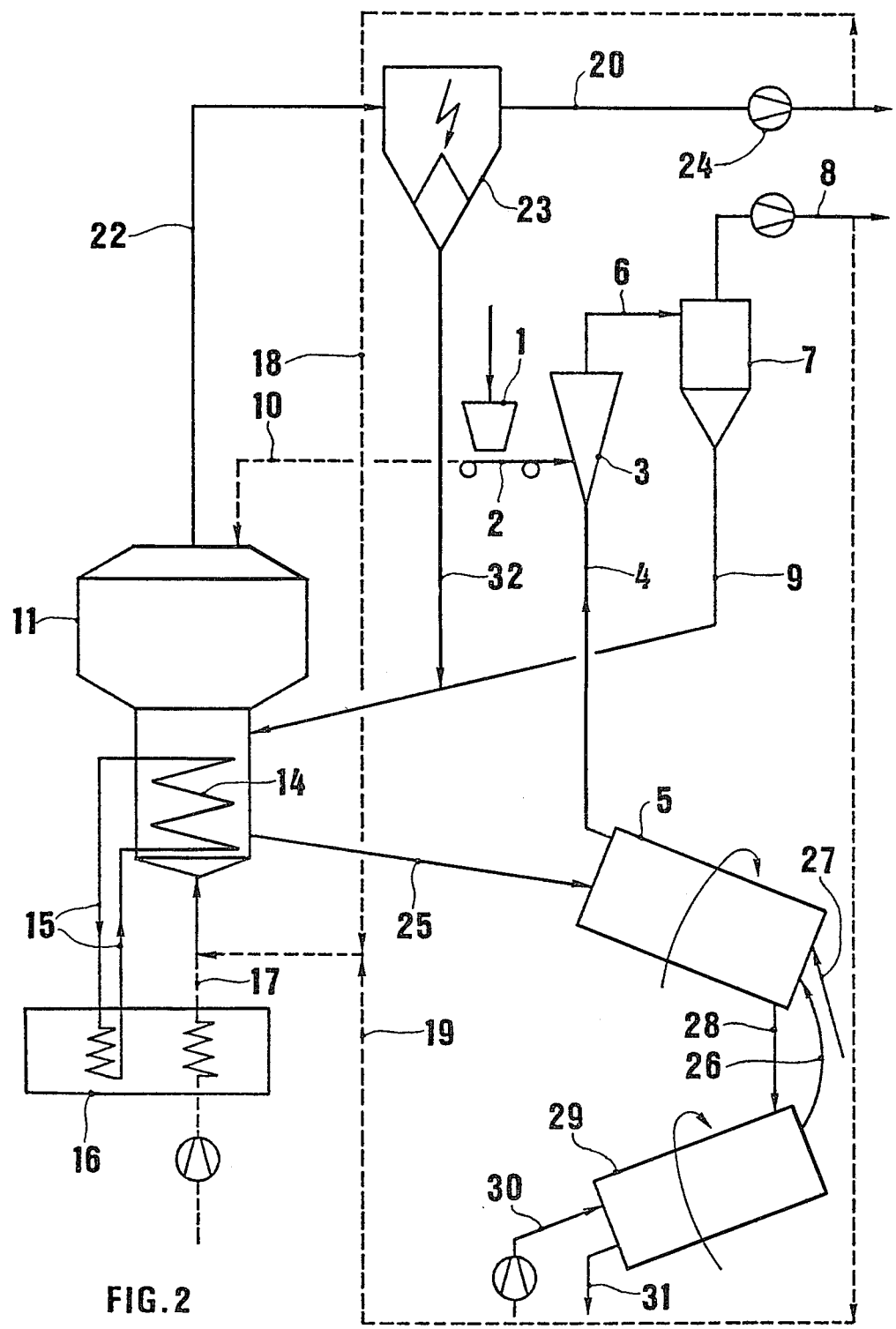

The invention is described hereinafter relative to embodiments and with reference to the drawings, in which:

FIG. 1 is a flow diagram of the process according to the invention using an expanded fluidized bed, and FIG. 2 is a flow diagram of the process according to the invention using a conventional fluidized bed.

In each of these embodiments, the fluidized bed is used in the zone for decomposing at least the preponderent part of the aluminum chloride hydrate.

In FIG. 1, aluminum chloride hydrate is supplied via charging meachinism 1 and dosing conveyor-type weigher 2 to a Venturi turbulator 3 which is subject to the action of the waste gases of rotary furnace 5 supplied via pipe 4. The gas/solid suspension formed passes via pipe 6 into a cyclone separator 7 and is separated into a gas flow removed via pipe 8 and a solids flow removed via pipe 9.

If desired, a partial flow of fresh aluminum chloride hydrate can be supplied to fluidized-bed reactor 11 in a direct manner via pipe 10.

The solids flow of pipe 9 passes into fluidized-bed reactor 11, constructed as a circulating fluidized bed with separator 12 and return line 13. Its heating surfaces 14 are heated by heating device 16 via a closed heat carrier circuit 15. The fluidizing gas is constituted as desired by gases preheated in heating device 16 and fed in via pipe 17 or gases recycled via waste gas pipes 20 and/or 8 supplied by pipes 18 and/or 19. The secondary gas can optionally be waste gas tapped from pipe 18/20 via pipe 21. The waste gas of fluidized-bed reactor 11 passes via pipe 22 into an electrostatic precipitator 23 and finally into waste gas line 20 provided with blower 24 and which leads into the not shown hydrogen chloride absorption plant. Dust separated in electrostatic precipitator 23 is returned to fluidized-bed reactor 11 via pipes 32 and 9.

A partial flow of partly decomposed aluminum chloride is supplied from fluidized-bed reactor 11 to rotary furnace 5 via cyclone separator 12 and pipe 25. Rotary furnace 5 is heated by oxygen-containing gases supplied via pipe 27 and fuel, particularly fuel oil and/or gas supplied via pipe 27.

The completely calcined aluminum oxide removed after an adequately long residence time from rotary furnace 5 passes via pipe 28 into rotary cooler 29, which is subject to the action of oxygen-containing gas supplied by means of pipe 30. After cooling, the aluminum oxide passes out of rotary cooler 29 via pipe 31.

The embodiment of the invention according to FIG. 2 differs from that according to FIG. 1 essentially in that the fluidized-bed reactor is operated in the conventional manner. Thus, in this case, there is no separator for the solids discharged from the fluidized-bed reactor in the case of the circulating fluidized bed, whilst the return line in fluidized-bed reactor 11 is also omitted. After a sufficiently long residence time, in fluidized-bed reactor 11, the solids pass via pipe 25 into rotary furnace 5.

Here again, fluidized-bed reactor 11 can be fluidized, as desired, with gases heated in heating device 16 or gases from waste gas lines 20 and/or 8 returned via pipes 18 and/or 19. A remaining solid and gas flow is identical with that of FIG. 1.

EXAMPLE 1

(With reference to FIG. 1)

By means of charging mechanism 1 and dosing conveyor-type weigher 2, every hour 136 t of $AlCl_3 \cdot 6H_2O$ with a surface moisture of approximately 15% and an average particle diameter $dp_{50}$ of 150 μm are charged. 50% of the charged material passes directly into fluidized-bed reactor 11 via pipe 10 and 50% of the charged material passes into Venturi turbulator 3, subject to the action of waste gases at 850° C from the rotary furnace and supplied by pipe 4. The quantity of waste gas was 28,700 Nm³/h. The suspension formed in the Venturi turbulator 3 is passed by pipe 6 into cyclone separator 7, where separation of the solids and gas took place. The gas, in a quantity of 39,200 Nm³/h at 150° C had a hydrogen chloride content of 13.4 Vol% and, after switching on the blower, passed into pipe 8 and from there via pipe 19, as fluidizing gas, into fluidized-bed reactor 11. The solid (58 t/h) separated in cyclone separator 7 was supplied via pipe 9, also at 150° C, to fluidized-bed reactor 11.

Fluidized-bed reactor 4 was heated with a fused mass of an alkali chloride mixture, fed in via circuit 15 at 460° C and discharged at 400° C. 8100 kg/h of heavy fuel oil ($H_u$ 9500 kcal/kg) were burned in heating device 16 for heating the fused mass. Due to the selected operating conditions, a temperature of 250° C was obtained in fluidized-bed reactor 11, having a diameter of 6.5m and an overall clearance of 20m. The turbulent gas velocity was 2.5m/sec. By means of suitable recycling of solids via cyclone separator 12 and pipe 13, an average residence time of 3 hours was obtained. The average suspension density was 150kg/m³ and the pressure loss 3000mm water column. Under the above-indicated conditions, about 90% of aluminum chloride was separated.

By means of pipe 25, every hour 34t were removed and supplied to rotary furnace 5. Rotary furnace 5 was subject to the action of 1625 kg/h of heavy fuel oil ($H_u$ 9500 kcal/kg) and 20700Nm³/h of air preheated in rotary cooler 29. A temperature of 900° C was obtained in the highest temperature zone.

After a sufficiently long residence time, the calcinate in a quantity of 25t/h was fed into rotary cooler 29 and cooled to 150° C.

Due to the quantitative recycling of waste gases from cyclone separator 7 into fluidized-bed reactor 11, a gas flow of 130,900 Nm³/h was obtained with a hydrogen chloride content of 27.8 Vol%. It was supplied at a temperature of 250° C via pipe 22 to electrostatic precipitator 23, where the dust was removed and finally passed via pipe 20 and blower 24 to the not shown absorption plant.

EXAMPLE 2

(With reference to FIG. 2)

By means of charging mechanism 1 and dosing conveyor-type weigher 2, every hour 136t of $AlCl_3$; $6H_2O$ with a surface moisture of approximately 15% and an average particle diameter $dp_{50}$ of 150 µm were charged. The installation for the decomposition of at least the preponderence part of the aluminum chloride comprised two identical parts in whose fluidized-bed reactors 11 each received 25% of the charged material. 50% of the $AlCl_3$. $6H_2O$ passed into a Venturi turbulator 3 in which it was suspended with 28,700 $Nm^3/h$ of waste gas at 850° C from rotary furnace 5 and was discharged via pipe 6. Solid and gas separation took place in cyclone separator 7. The gas at a temperature of 150° C and in a quantity of 39,200 $Nm^3/h$ and containing 13.4 Vol% of hydrogen chloride was drained off via pipe 8 into the not shown absorption plant.

The solids separated in cyclone separator 7 were passed via pipe 9 into fluidized-bed reactor 11, whose lower area had in each case a diameter of 9.6m and an overall height of 24m. The total flow of 58t was subdivided into two partial flows each of 29t.

Fluidized-bed reactors 11 were fluidized with waste gas recycled from pipe 20. The quantity of fluidizing gas was 11,200 $Nm^3/h$ per reactor. Heating took place by means of a fused mass of an alkali chloride mixture carried in circuit 15, fed into fluidized-bed reactors 11 at 460° C and discharged at 400° C. Reheating to 460° C took place in heating device 16 by burning 8100 kg/h of heavy fuel oil.

As a result of the selected operating conditions, the temperature in the fluidized-bed reactors 11 was 250° C, the suspension density in the area filled with solids 500 $kg/m^3$, the pressure loss 4500mm water column and the turbulent gas velocity 0.5m/sec. The waste gas quantity of 114,100 $Nm^3/h$ obtained in the fluidized-bed reactors 11 was passed at 250° C into electrostatic precipitator 23, where the dust was removed and discharged via pipe 20. 91,700 $Nm^3/h$ with 37 Vol% of hydrogen chloride was passed into the not shown absorption plant.

17 t/h (total 34 t/h) were passed from the fluidized-bed reactors into rotary furnace 5. Rotary furnace 5 was heated by burning 1625 kg/h of heavy fuel oil and 20700 $Nm^3/h$ of air, preheated in rotary cooler 29. The temperature in the hottest zone was 900° C.

After an adequately long residence time, the completely calcined aluminum oxide passed via pipe 28 into rotary cooler 29 and was cooled therein to 150° C. The quantity of $Al_2O_3$ produced was 25 t/h.

We claim:

1. A continuous process for the thermal decomposition of aluminum chloride hydrate into solid aluminum oxide and gaseous hydrogen chloride comprising
    (1) introducing the aluminum chloride hydrate into a thermal reaction zone,
    (2) introducing a fluidizing gas into the reaction zone to maintain the aluminum chloride hydrate in a fluidized state within said reaction zone,
    (3) indirectly heating the aluminum chloride hydrate while in the fluidized state in said thermal reaction zone until a predominant portion of the thermal composition of the aluminum chloride hydrate has taken place in the reaction zone,
    (4) separating the effluent from the thermal reaction zone into a gaseous phase containing hydrogen chloride and a solid phase of partially decomposed aluminum chloride hydrate,
    (5) passing the separated solid phase of partially decomposed aluminum chloride hydrate to a rotary calcination zone,
    (6) directly heating the partially decomposed aluminum chloride hydrate in the calcination zone to calcining temperature substantially to complete the thermal decomposition of the aluminum chloride hydrate to hydrogen chloride and solid aluminum oxide.
    (7) cooling the solid aluminum oxide from the calcining zone, and
    (8) processing the gaseous phase from step 4 for removal of entrained solids.

2. A process according to claim 1, in which the decomposition of the aluminum chloride hydrate in the reaction zone is carried out at a temperature in the range of 200° to 400° C.

3. A process according to claim 1, in which 70 to 95% of the aluminum chloride is decomposed in the thermal reaction zone.

4. A process as claimed in claim 1, in which the aluminum chloride hydrate is reacted in the thermal reaction zone in a circulating fluidized bed.

5. A process as claimed in claim 4, in which the fluidized bed is maintained at an average suspension density within the range of 50–400 $kg/m^3$ and the turbulent gas velocity is maintained within the range of 1.5–5 m/sec.

6. A process as claimed in claim 1 which includes the step of cycling hot gases containing hydrogen chloride from the calcination zone to the thermal reaction zone.

7. The process as claimed in claim 1, in which a part of the aluminum chloride hydrate introduced into the reaction zone is preheated by passing the aluminum chloride hydrate in heat exchange relation with hot gases from the calcination zone.

8. A process as claimed in claim 1, in which the aluminum chloride hydrate is reacted in the thermal reaction zone in a conventional fluidized bed.

9. A process as claimed in claim 8, in which the fluidized state is maintained at an average suspension density within the range of 600–1000 $kg/m^3$ and the turbulent gas velocity is maintained below 0.8 m/sec.

* * * * *